United States Patent [19]

Norris

[11] Patent Number: 4,715,525

[45] Date of Patent: Dec. 29, 1987

[54] METHOD OF BONDING COLUMBIUM TO TITANIUM AND TITANIUM BASED ALLOYS USING LOW BONDING PRESSURES AND TEMPERATURES

[75] Inventor: Brian Norris, San Diego, Calif.

[73] Assignee: Rohr Industries, Inc., Chula Vista, Calif.

[21] Appl. No.: 928,862

[22] Filed: Nov. 10, 1986

[51] Int. Cl.[4] .................... B23K 20/00; B23K 20/16; B23K 20/22

[52] U.S. Cl. ............................... 228/194; 228/263.21

[58] Field of Search ........... 228/194, 195, 198, 263.19, 228/263.21

[56] References Cited

U.S. PATENT DOCUMENTS 4,026,677  5/1977  Galasso et al. ...................... 228/195
4,034,454  7/1977  Galasso et al. ...................... 228/194
4,034,906  7/1977  Carlson et al. ...................... 228/194

Primary Examiner—Nicholas P. Godici
Assistant Examiner—Samuel M. Heinrich
Attorney, Agent, or Firm—Patrick J. Schlesinger; Jay M. Cantor; Frank D. Gilliam

[57] ABSTRACT

The disclosure relates to a method of joining titanium and titanium based alloys to columbium at low pressure and low temperature, wherein a titanium foil is electroplated with layers of copper and nickel with a columbium sheet then being placed in intimate contact with the exposed layer. The materials are then heated in a vacuum to a temperature above the Ti-Cu-Ni eutectic temperature and below the beta-transus of the titanium material to provide a joining of titanium to columbium without materially altering the mechanical properties of the materials involved.

8 Claims, 2 Drawing Figures

METHOD OF BONDING COLUMBIUM TO TITANIUM AND TITANIUM BASED ALLOYS USING LOW BONDING PRESSURES AND TEMPERATURES

BACKGROUND OF THE INVENTION

1. Field of the Invention

This invention relates to a method of joining columbium to to titanium and titanium based alloys and, more specifically, to a method of performing such joining under relatively low pressure and low temperature conditions.

2. Brief Description of the Prior Art

Columbium (Cb) is a desirable material for use in environments requiring high temperature regimes (i.e., about 2000° to about 2500° F.), such as for use in thermal protection systems. Columbium and titanium are metallurgically compatible with each other and can be diffusion bonded to each other with high temperatures and pressures. Bi-metallic joints can also be made using T.I.G. and electron beam welding techniques. Prior art in regard to brazing columbium to titanium is set forth in a publication by A. I. Chernitsyn et al., "Svar Proiz", 1975, No. 7, pgs. 26 to 28. Chernitsyn electroplated copper onto the titanium. Nickel was then electroplated on top of the copper. The plated titanium was bonded to the columbian at 1895° F. for 45 minutes with a bonding pressure of about 7.5 ksi. Nickel has a high chemical affinity for columbium and this facilitated the dissolving of the columbium oxide film while the copper formed a large amount of liquid phase with the titanium. The diffusion brazing was completed through an isothermal solidification mechanism resulting in good brazed and diffused joints.

Chernitsyn bonded columbium to titanium by utilizing the Ti-Cu-Ni ternary eutectic liquid (1652° F.) as well as the Ti-Ni binary eutectic (1728° F.) as a brazing medium. The bonding, however, was carried out at 1895° F. This temperature is in excess of the beta-transus of Ti-6Al-4V and the use of this brazing temperature would severely reduce the mechanical properties of Ti-6Al-4V. As the ternary eutectic temperature of Ti-Cu-Ni is only 1652° F., it was considered that a columbium-titanium joint could be produced by brazing below the beta-transus and increasing the time from one to two hours, thereby improving the mechanical properties of the materials after completion of the joint.

SUMMARY OF THE INVENTION

Briefly, the invention herein comprises a unique temperature/pressure method of bonding columbium to titanium and titanium based alloys. Low temperature bonding below the beta-transus of the titanium material to be bonded (approx. 1750° F.) is possible due to a low melting point phase that is produced by the interdiffusion of ultrathin (less than 0.0005 inch) copper and nickel with the titanium. The nickel aids in the wetting of the columbium. Isothermal solidification may be accomplished through dilution of the copper/nickel components. This invention may be used in alternate thermal protection systems.

The above is accomplished by plating a thin layer of copper and then a thin layer of nickel onto a cleaned titanium sheet. A cleaned columbium sheet was then placed in intimate contact with the plated titanium sheet and against the nickel layer thereon under a pressure of 10 psi in a vacuum at a temperature of 1760° F. for two hours. The titanium bonded to the columbium with a remelt temperature in excess of 2300° F.

DESCRIPTION OF THE PREFERRED EMBODIMENT

Figure 1:
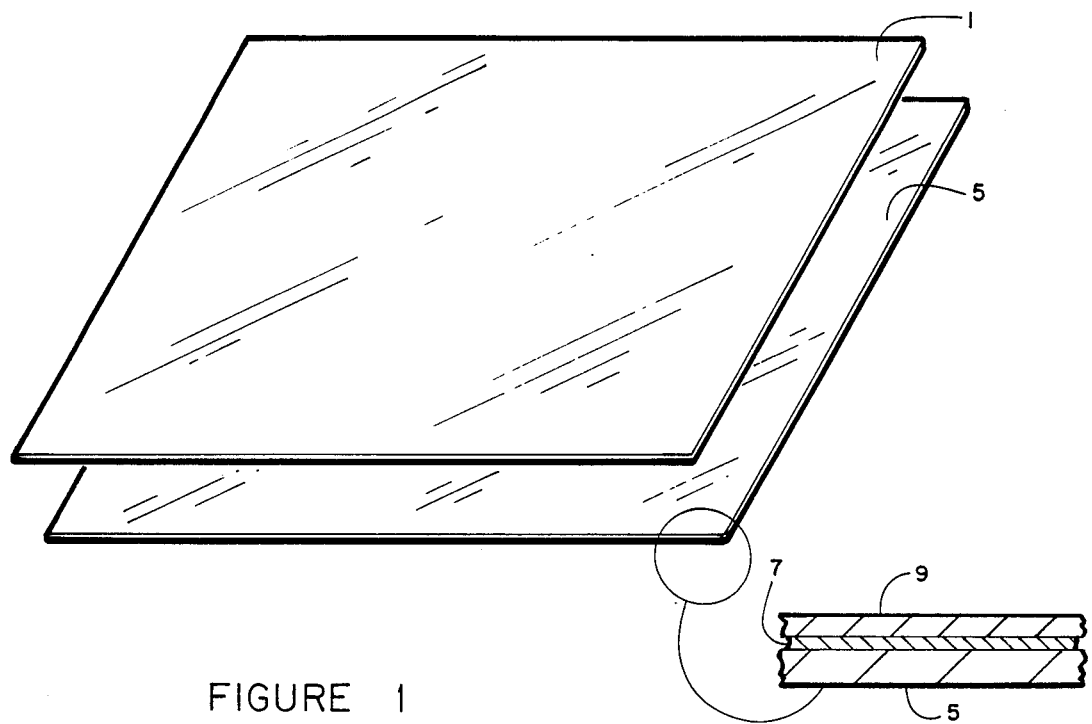
FIG. 1 is an exploded view of an arrangement to be brazed in accordance with the present invention.
Figure 2:
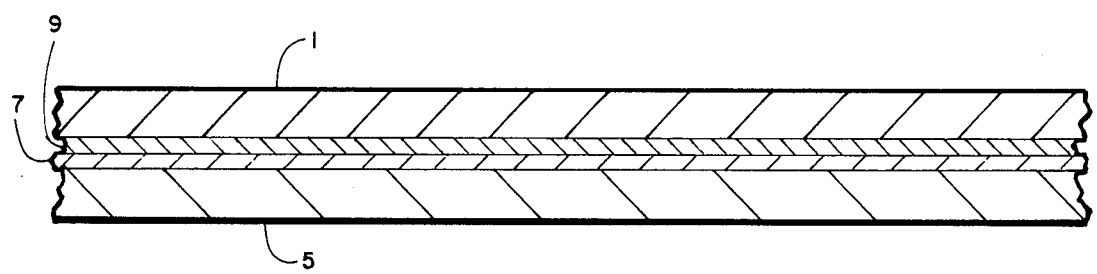
FIG. 2 is a cross-sectional view of the brazed product in accordance with the present invention.

Referring now to FIG. 1 and 2, there is shown an exploded view of an arrangement for brazing a thin columbium sheet 1 to a sheet of titanium or titanium based alloy 5 and specifically, Ti-6Al-4V as well as the brazed joint respectively. A layer of copper 7 is electroplated onto the cleaned titanium sheet and a layer of nickel 9 is electroplated onto the copper layer. The sheets 1 and 5 are placed in intimate contact with each other with the electroplated layers therebetween as shown in FIG. 2 with the nickel layer 9 abutting the columbium sheet 1. The titanium sheet was 0.012 inch thick and was bonded to a 0.002 inch thick columbium foil using a 0.125 inch overlap. The columbium was "Bright Boy" abrasively cleaned prior to bonding and the titanium was processed cleaned prior to electroplating. The titanium was then electroplated with 70 percent copper and 30 percent nickel, respectively. The two plating densities used in the samples were (a) 3.5 g/ft$^2$ ($0.165 \times 10^{-3}$ inches) copper plus 1.5 g/ft$^2$ ($0.083 \times 10^{-3}$ inch) nickel and (b) 1.75 g/ft$^2$ ($0.071 \times 10^{-3}$ inch) copper plus 0.75 g/ft$^2$ ($0.036 \times 10^{-3}$ inches) nickel. Bonding was carried out in a vacuum at 1750° F. for two hours at 10 psi bonding pressure. This temperature was below the beta-transus of the titanium material utilized.

Both samples (a) and (b) were metallographically, mechanically and remelt tested after joining. Lap shear testing on both specimens caused the specimens to fail outside of the bonded area, indicating that a good bond was formed. A void-free bond was observed in an unetched microsection of sample (a). A maximum of 40 percent voiding was observed in the unetched microsection of sample (b), reflecting the decreased amount of eutectic bonding liquid produced in the (b) samples. From a microhardness test it was demonstrated that no brittle intermetallics existed across the bond area. Remelt studies carried out on bonded strips held between buss bars in an evacuated bell jar showed that the remelt temperature of the joint was in excess of 2300° F.

Ti-6Al-4V was bonded to columbium foil in a similar manner to that described in the above paragraphs with the exception that a 100 percent nickel interlayer was used with plating densities of (c) 2.5 g/ft$^2$ and (d) 5 g/ft$^2$ and a bonding temperature of 1760° F. Although remelt temperatures in excess of 2300° F. were achieved, the joints contained excessive voiding which contributed to the partial bond failures observed after lap shear testing.

It can be seen that a procedure has been developed for bonding titanium sheet to columbium wherein good bonds are provided without adversely affecting the properties of the materials involved.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A method of bonding columbium to titanium and titanium based alloys, comprising the steps of:
   (a) providing a first thin sheet of columbium,
   (b) providing a second member having a composition taken from the class consisting of titanium and titanium based alloys,
   (c) forming a layer of nickel and a layer of copper onto said second member, each of said layers having a thickess of less than about 0.0005 inches,
   (d) placing said first sheet and second member in intimate contact with each other with said layers therebetween,
   (e) heating the arrangement of (d) in a vacuum to a temperature below the beta-transus of the titanium material in (b) and above 1652° F., and
   (f) cooling the arrangement of (e) to ambient temperature.

2. The method of claim 1 wherein said layers of copper and nickel are formed by electroplating.

3. The method of claim 1 wherein said second member is a thin sheet.

4. The method of claim 2 wherein said second member is a thin sheet.

5. The method of claim 1 wherein the ratio by weight of said copper to said nickel is about 7:3.

6. The method of claim 2 wherein the ratio by weight of said copper to said nickel is about 7:3.

7. The method of claim 3 wherein the ratio by weight of said copper to said nickel is about 7:3.

8. The method of claim 4 wherein the ratio by weight of said copper to said nickel is about 7:3.

* * * * *